United States Patent [19]

Rosenthal

[11] 4,445,120

[45] Apr. 24, 1984

[54] RADIOSONDE

[75] Inventor: David A. Rosenthal, Ridgecrest, Calif.

[73] Assignee: The United States of America as represented by the Secretary of the Navy, Washington, D.C.

[21] Appl. No.: 251,806

[22] Filed: Apr. 7, 1981

[51] Int. Cl.³ .............................................. G01S 3/02
[52] U.S. Cl. .................................... 343/462; 343/451; 343/458
[58] Field of Search .......... 343/112 R, 112 A, 112 D, 343/6.5 R, 12 A, 103, 450, 387, 458, 462, 451

[56] References Cited

U.S. PATENT DOCUMENTS

| 2,717,309 | 9/1955 | Campbell | 250/17 |
| 3,069,668 | 12/1962 | Siderman | 34/178 |
| 3,069,668 | 12/1962 | Siderman | 340/870.1 |
| 3,194,067 | 7/1965 | Grillo | 73/170 |
| 3,320,616 | 5/1967 | Kaufman et al. | 343/112 |
| 3,564,543 | 2/1971 | Hehama et al. | 343/6.5 R |
| 3,721,985 | 3/1973 | Perfitt | 343/103 |
| 3,774,215 | 11/1973 | Reed | 343/112.5 R X |

Primary Examiner—S. C. Buczinski
Assistant Examiner—K. R. Kaiser
Attorney, Agent, or Firm—Robert F. Beers; W. Thom Skeer; Kenneth G. Pritchard

[57] ABSTRACT

An apparatus and method of measuring elevation of vehicles, such as radiosondes, aircraft, or re-entry vehicles, is provided by identifying the specific geographic location of the vehicle in question and its difference from the geographic location of a reference station. The reference station altitude is then used as an arbitrary level to measure difference in elevation of the vehicle in question.

3 Claims, 3 Drawing Figures

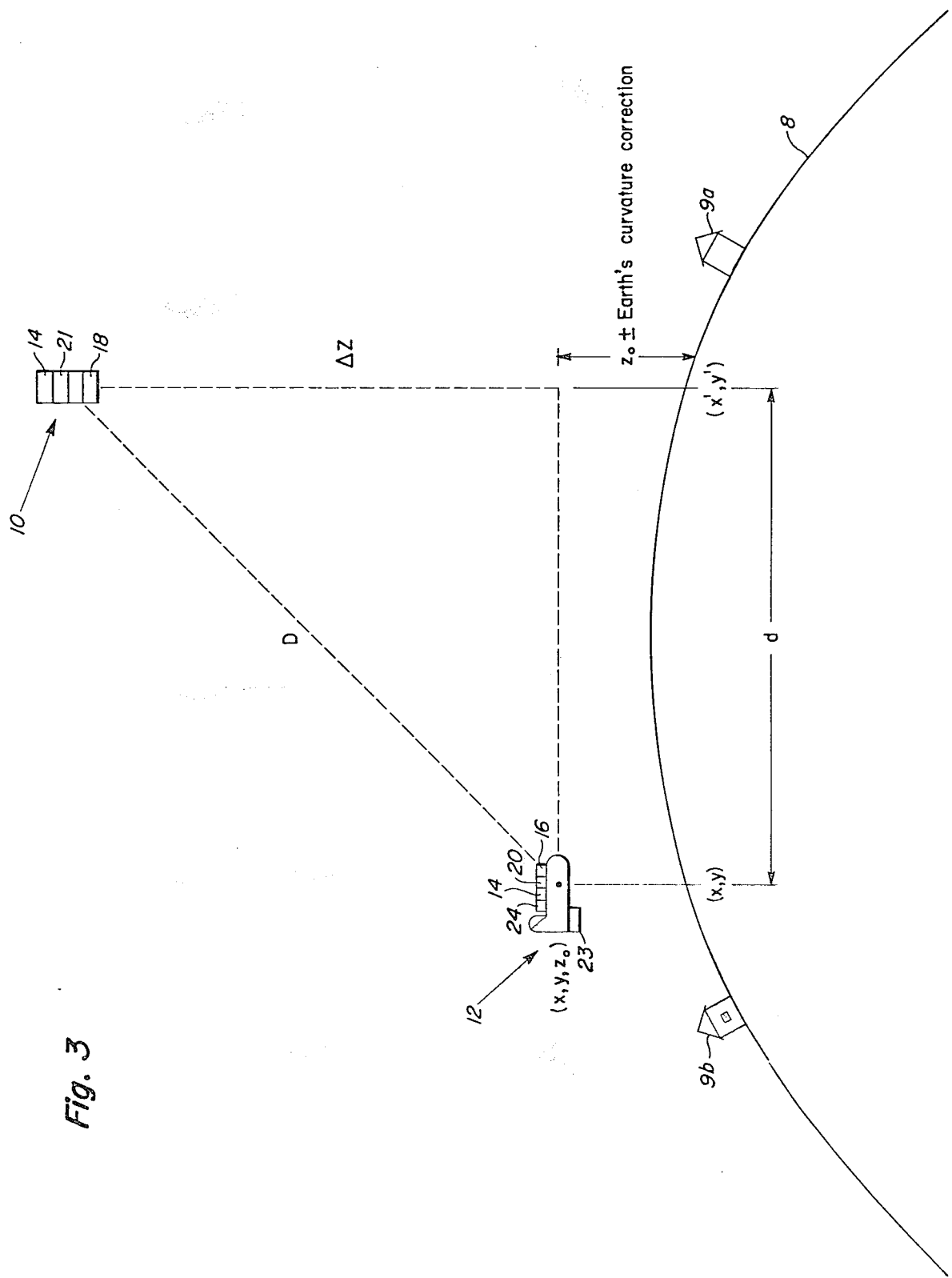

1

RADIOSONDE

BACKGROUND OF THE INVENTION

1. Field of the Invention

The present invention deals with methods of determining the altitude of objects in the atmosphere. Specifically it pertains to radio wave positioning of the vehicle in the atmosphere as compared to a reference station.

2. Description of the Prior Art

Altitude determination is presently made by measurements of static pressure which is compared to the standard atmosphere of a given altitude. The standard altitude is calculated from a set of given parameters. These parameters are treated as constant factors which only vary according to altitude. In actual practice, the various parameters, such as temperature and pressure, differ from those used to determine the standard. This difference introduces error into the system. The differences hinder an accurate measurement of height above the surface.

SUMMARY OF THE INVENTION

The altitude measurement of a vehicle according to the present invention requires an accurate location of the vehicle geographically. This is found from standard navigational equipment used for ships, such as the Omega system or the Loran system. Once the geographical location of the vehicle is identified, a timing signal is transmitted to it from a reference station. The geographical location and altitude of this station is known. The timing signal travels to the vehicle where it is detected and a return signal is transmitted to the reference station. Timing the difference between transmission and reception of the return signal provides information to calculate the distance between the two since the total time and the velocity of propagation are both known. The remote vehicle also transmits its geographic location to the reference station. Application of the Pythagorean theorm permits direct calculation of the difference in altitude of the vehicle from that of the reference station.

It is an object of the present invention to define a method of measuring altitude of airborne vehicles independent of atmospheric parameters. It is a further object of the present invention to provide an apparatus which calculates the exact altitude of airborne vehicles without measurement of atmospheric parameters.

BRIEF DESCRIPTION OF THE DRAWINGS

FIG. 3 is an operational view of the present invention.

DESCRIPTION OF THE PREFERRED EMBODIMENT

The present method involves vehicles equipped with onboard global navigational equipment. Currently world wide networks such as Omega and Loran permit ships to determine their geographic location at any given time. For purposes of the present invention, the phrase "geographic location" refers to the latitude and longitude of the object to be located and does not include the elevation of the object. For purposes of simplicity, the x-coordinate of a Cartesian system represents the latitude and the y-coordinate represents the longitude. The definition of X and Y is arbitrary.

Figure 1:
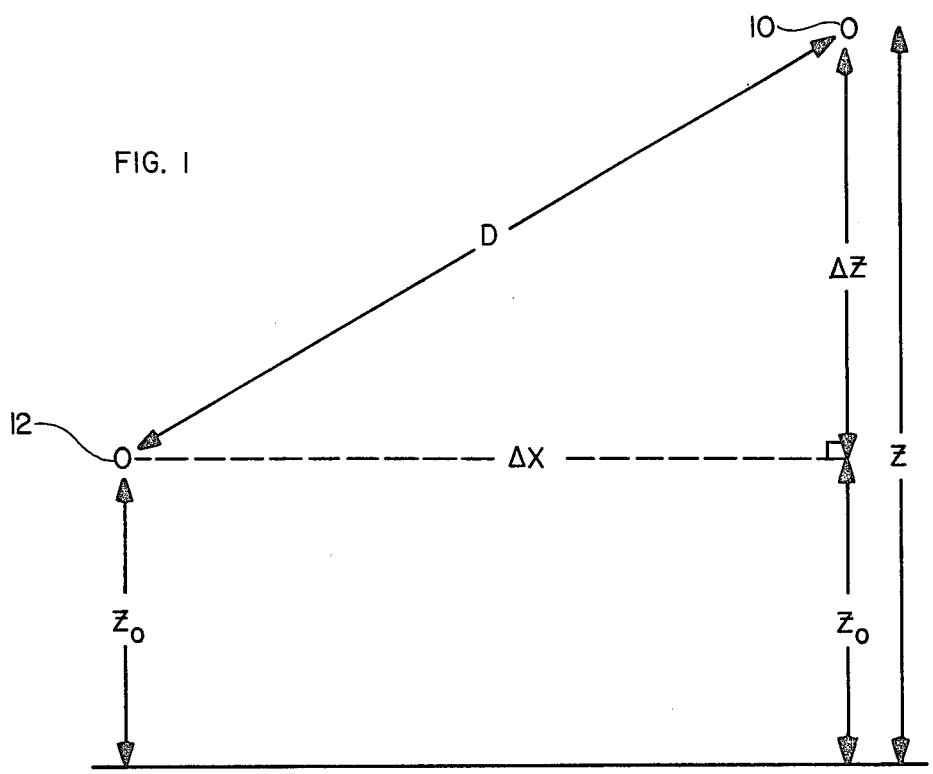
FIG. 1 is a profile of how the present invention determines elevation.

The object of undetermined elevation can be a radiosonde used to gather information prior to reentry of missiles from above the atmosphere or it could be equipment on a re-entry vehicle itself. It is also possible with present electronics to design systems using the present invention to locate aircraft altitude with respect to known reference stations. FIG. 1 shows a profile side view of how the present invention permits a remote vehicle 10 to find its altitude Z by comparing the difference in altitude $\Delta Z$ to the altitude, $Z_o$, of a known reference station 12. Reference station 12 must be determined with accurate geographical coordinates as well as the station elevation/altitude. Remote vehicle 10 has its geographical location determined by the Omega system or a comparable system. The Omega system is a well known existing system and is therefore not shown.

Figure 2:
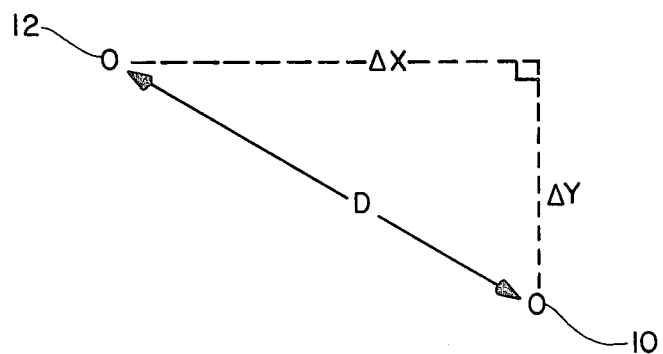
FIG. 2 is a high altitude view of how geographic difference between the reference station and an airborne station is measured in the present invention.

FIG. 2 shows a top view or above view of the difference in location of reference station 12 and remote vehicle 10. The difference in geographical position between the two can be described as a difference in longitude, $\Delta Y$, and a difference in latitude, $\Delta X$. As represented in FIG. 2, the difference in $\Delta X$ and $\Delta Y$ form a right triangle which permits the actual distance between the two to represent the hypotenuse of the right triangle. As shown in FIG. 1 and FIG. 2, the same distance between the two is represented by the letter D. In FIG. 1, D is foreshortened because the actual differences caused by $\Delta Y$ is not shown. In FIG. 2, D is foreshortened because the difference in elevation, $\Delta Z$, is not shown. In actuality, D can be thought of as two components. However, since the three dimensional Pythagorean theorm is well known, the letter D is used for convenience to emphasize the actual distance being considered. The effects of the earth's curvature can be ignored for relatively close objects.

Reference station 12 coordinates may be expressed in standard three dimensional Cartesian coordinates, $X_o$, $Y_o$, and $Z_o$ with $Z_o$ representing station elevation/altitude. Since the reference station geographic location and remote vehicle geographic location are known, $\Delta X$ and $\Delta Y$ are directly calculated. Reference station 12 contains a transmitting device, not shown, such as a radar beacon or other electronic equipment which transmits a timing signal towards remote vehicle 10. The timing signal is detected by the remote vehicle and a return signal is transmitted back to reference station 12. The total time required for a remote vehicle 10 to receive and transmit the signal is equal to the round trip time between the two points plus the transponder circuitry lag time.

As a first approximation of the distance D between the two, D can be solved by setting it equal to one-half $T_{tot} \div C$ $$D = T_{tot}/2C$$

where C = the speed of light, and $T_{tot}$ = 2 times the time of flight, $t_f$, plus the transponder circuitry lag time, $t_{lag}$. If $t_{lag}$ becomes a significant factor and offsets the exact calculation, the exact distance can be found by subtracting $t_{lag}$ from $T_{tot}$ to determine, $t_f = T_{tot} - t_{lag}$, which is the total transmittal time. Using the known parameters of reference station 12, $X_o$, $Y_o$ and $Z_o$ and the known geographic location of remote vehicle 10, X and Y, and having calculated the absolute distance between the two points, D, the altitude of the remote vehicle, Z, can be found by applying the Pythagorean Theorm.

Based on FIG. 1 and FIG. 2, $D^2 = \Delta X^2 + \Delta Y^2 + \Delta Z^2$ where $\Delta X$, $\Delta Y$, and $\Delta Z$ represent the difference between remote vehicle coordinates and reference station coordinates. Since $\Delta x$ and $\Delta Y$ have been calculated by comparing geographic locations and D has been calculated by the timing signal we have that $$\Delta Z^2 = D^2 - (\Delta X^2 + \Delta Y^2)$$

or $$\Delta Z = \pm \sqrt{D^2 - \Delta X^2 - \Delta Y^2}.$$

The above equation shows that there are two possible solutions for $\Delta Z$. It is up to the flight characteristics for a remote vehicle to determine which solution to use. For example, a rising balloon implies use of the positive solution while a dropsonde requires the negative solution. In general, motion sensors can be employed on remote vehicle 10 to determine the sign of $\Delta Z$. If there is any ambiguity in $\Delta Z$, comparison of calculations from one timing signal to the next provide an indication of the relative motion of remote vehicle 10. For example, a re-entry vehicle entering the atmosphere will clearly have a positive $\Delta Z$ because it will be elevated higher than any reference station. As the re-entry vehicle becomes lower in the atmosphere, the value of $\Delta Z$ will decrease in consecutive measurements. By monitoring the change in the absolute value of $\Delta Z$, it will become clear that a point is reached where the absolute value of $\Delta Z$ starts to increase between consecutive measurements. Processing circuitry interprets this as a change in value of $\Delta Z$ from plus to negative values. This technique is well known in the art.

The final solution gives the remote vehicle altitude with respect to the reference station as $$Z = Z_o + (\Delta Z)$$

Reference station 12 is thus able to closely monitor the location of remote vehicle 10. By using standard communication equipment, remote vehicle 10 can be ordered to perform various tasks at specific altitudes.

FIG. 3 shows remote vehicle 10 and reference station 12 at different positions with respect to the earth's surface 8. Ground stations 9a and 9b are part of a location system, such as Loran or Omega. Both remote vehicle 10 and reference station 12 have navigational receivers 14 turned to ground stations 9a and 9b or other grounds stations, not shown. Navigational receivers 14 identify the exact geographic location they are at in terms of X and Y. Reference station 12, such as an airplane, is at an elevation of $Z_o$ above ground 8. Reference station 12 has a transmission/reception equipment package 16 which sends a signal to remote vehicle 10 along path D and receives signals from remote vehicle 10. The received signals may be reflected signals, such as radar reflections if package 16 includes a radar beacon, or signals originated at remote vehicle 10.

Remote vehicle 10 has a transponder 18 which receives the signal from reference station 12 and returns a signal to reference station 12. It is assumed that because the signals travel at the speed of light that the return signal retraces the same path D as the original transmission. Thus, the total distance traveled is 2D. At this stage, the following information is known, the position (X, Y, $Z_o$) of reference station 12, the position (X', Y') of remote vehicle 10 and the shortest distance D between the two. Remote vehicle 10 has a transmitter 21 which is connected to navigational receiver 14. Transmitter 21 broadcasts the position of remote vehicle 10 (X', Y') to reference station 12 where it is received by a receiver 23.

Reference station 12 has a compurter 20 which receives input from navigational receiver 14, package 16, and receiver 23. Computer 20 is thus fed X, Y, $Z_o$, X', Y', and D. Calculations of $\Delta X$, $\Delta Y$, and then $\Delta Z$ are then made. A sensing means 24 receives the $\Delta Z$ output of computer 20. If the origination point of remote vehicle 10's path is known, sensing means 24 will set the appropriate + or − sign to $\Delta Z$ and monitor $\Delta Z$ as elevation decreases or increases. Sensing means 24 may be a monitor on package 16 if the receiver portion of package 16 is direction sensitive, such as a quadrant antenna. Numerous other direction determining apparatus may be used. If sensing means 24 is limited to comparing changing absolute values of $\Delta Z$, sensing means 24 may be a separate computer or a subroutine for computer 20. Computer 20 may also be programmed to allow for the earth's curvature. In general, this correction is trivial compared to elevation changes in local geography.

The present invention does not rely on atmospheric pressure and thus an absolute measurement of elevation is made. It will be obvious to those skilled in the art that numerous modifications to the above invention can be made.

I claim:

1. An altitude measuring system for a radiosonde comprising:

means for identifying the exact geographic location of said radiosonde, said geographic location consisting of the latitude and longitude of said radiosonde;

means for transmitting a timing signal from a reference station of known geographic location and known altitude to said radiosonde;

means for returning said timing signal from said radiosonde back to said transmitting means;

means for receiving said returned signal located with said transmitting means at said reference station;

means for communicating said radiosonde's geographic position from said identification means to said reference station;

a computer connected to receive said transmitted signal, said return signal, and said radiosonde's geographic position, the time difference between said transmitted signal and said return signal proportional to twice the distance D between said radiosonde and said remote reference station said computer programmed such that the distance D is determined and the height $\Delta Z$ of said radiosonde above or below said reference station according to the equation $$\Delta Z = \pm \sqrt{D^2 - X^2 - Y^2}$$

is determined where $\Delta Z$ = the difference in altitude between the reference station and the radiosonde.

D = the distance between the radiosonde and the reference station, $\Delta X$ = the difference in latitude between the reference station and the radiosonde, and ΔY = the difference in longitude between the reference station and radiosonde; and means for sensing motion are connected to said computer to evaluate whether ΔZ is positive or negative.

2. An altitude measuring radiosonde as described in claim 1 where said transmitting means comprises a radar beacon.

3. An altitude measuring radiosonde as described in either claim 1 or claim 2 where said return means comprises a transponder.

* * * * *